United States Patent [19]
Brinkley

[11] Patent Number: 5,451,187
[45] Date of Patent: Sep. 19, 1995

[54] POOL POCKET FASTENERS

[76] Inventor: Adlai Brinkley, P.O. Box 729, El Reno, Okla. 73036

[21] Appl. No.: 107,647

[22] Filed: Aug. 18, 1993

[51] Int. Cl.⁶ .............................................. A63D 15/00
[52] U.S. Cl. ......................................................... 473/28
[58] Field of Search ................... 473/19, 28; 411/378, 411/427, 447, 458, 468, 471, 508, 519, 510

[56] References Cited

U.S. PATENT DOCUMENTS

| | | | |
|---|---|---|---|
| 46,136 | 1/1865 | Petersen . | |
| 395,803 | 1/1889 | Adams . | |
| 842,550 | 1/1907 | Houts . | |
| 1,173,859 | 2/1916 | Porter | 473/28 |
| 1,451,813 | 4/1923 | Brubacker | 473/28 |
| 1,509,144 | 9/1924 | Harmel | 473/28 |
| 1,535,926 | 4/1925 | Leone | 473/28 |
| 1,539,192 | 5/1925 | Jaeger | 473/28 |
| 2,650,516 | 9/1953 | Poupitch | 411/508 |
| 2,853,913 | 9/1958 | Rapata | 411/508 |
| 2,927,497 | 3/1960 | Rapata | 411/508 |
| 3,342,095 | 9/1967 | Buntic | 411/508 |
| 3,412,437 | 11/1968 | Bennette | 411/508 |
| 3,476,008 | 11/1969 | Pearson et al. | 411/508 |
| 3,693,494 | 9/1972 | Meyer | 411/508 |
| 3,756,115 | 9/1973 | Schuplin | 85/5 |
| 3,876,202 | 4/1975 | Allison | 273/3 |
| 4,739,543 | 4/1988 | Harris | 411/508 |
| 4,776,739 | 10/1988 | Hamnan | 411/447 |
| 4,900,021 | 2/1990 | Lalick | 473/28 |

Primary Examiner—Theatrice Brown
Attorney, Agent, or Firm—Dougherty, Hessin, Beavers & Gilbert

[57] ABSTRACT

A combination pool table structure consisting of pocket corner mounts and pool pockets each secured by means of a press-fit, molded nylon fastener of a type having a flat head extending a cylindrical shank axially for a pre-set length and which the forms into a tapering insert portion having one or more interfering wedge formations on the insert portion circumfery.

7 Claims, 2 Drawing Sheets 5,451,187

POOL POCKET FASTENERS

BACKGROUND OF THE INVENTION

1. Field of the Invention

The invention relates generally to fasteners of a type suitable for securing pool table replaceable pockets and, more particularly, but not by way of limitation, it relates to an improved type of securing assembly including a steel insert and driveable plastic fastener which enables more rapid and secure pocket replacement.

2. Description of the Prior Art

The prior art has seen very great changes in billiard and pool table construction over a period of very many years since the table games are quite old in origin. In the last century, and especially in the United States, pool table design has enjoyed a somewhat more orderly evolution of construction modes that have been dictated largely by modern industrial factory capabilities and craft controls. Still more recently, pool table construction has been influenced due to the very great number of commercial establishments that include pool tables and even coin-operated pool table installations. As a result, there has been a great standardization towards pool table construction thereby to enable more effective maintenance and upkeep of pool tables on a large scale basis. Accordingly, the present invention is directed to pool pocket replacement method and apparatus that can be utilized on a large scale or widespread basis with great savings in time.

A U.S. Pat. No. 46,136 in the name of Petersen is of interest as it regards a pool pocket that is mounted using a plurality of screws which extend through pre-drilled holes in table flanges that are then secured to the table side rails adjacent the pocket drop. This teaching constitutes a very early mode of pocket securing. A U.S. Pat. No. 395,803 to Adams discloses a pool table pocket variation of a type that is quite different in overall configuration but is still anchored in place at the ball drop by means of horizontal wood screws secured into the table woodwork. U.S. Pat. No. 842,550 depicts a pool table pocket that is mounted by means of a plurality of projections which extend from a spring-like supporting member. The supporting member is flexible to allow positioning and snap-in lodging of the projections in respective sockets thereby to enable a quick-change insertion. This teaching finds little or no present day usage. Another U.S. Pat. No. 1,539,192 in the name of Jaeger utilizes a group of spaced vertical screws which hold the pocket in place relative to the pocket drop and table rails. A great many variations will be found for pool pocket removal and replacement; however, in nearly all cases the operation requires more time-consuming installation mode and special tool considerations.

SUMMARY OF THE INVENTION

The present invention relates to an improved type of pool table pocket securing apparatus that is capable of quick and positive replacement in existing, standardized pool table frame structure. The standard corner frame used in many commercial-type pool tables includes plural holes formed through the corner frame and pocket wall on each side of the pocket entry side wall. After removal of damaged pocket, it is only necessary to place the new, replacement pocket within the pocket inner wall mount with securing holes aligned whereupon a metal insert panel of thin, rectangular shape is positioned between the replacement pocket and the metal corner mount. When holes are aligned, a locking fastener may be driven therein, as by hammer blow, whereupon the shank of the fastener includes an interference formation that expands after quick forced insertion to lock the fastener. Two such fasteners may be force-fit on each side of the pocket entry to secure the new pocket in place and such replacement is effected quickly and easily with minimal disruption.

Therefore, it is an object of the present invention to provide a force-fit type of fastener that may be rapidly and securely positioned in operation.

It is also an object of the invention to provide a pool pocket fastener that will not break and plug the securing holes during a pocket change operation.

It is still further an object of the present invention to provide a pool pocket securing fastener that reduces greatly the time for changing and repairing damaged pool table pockets.

Finally, it is an object of the present invention to provide a pool table pocket fastener that is highly effective yet aesthetically desirable in providing a rugged pool pocket structure.

Other objects and advantages of the invention will be evident from the following description when read in conjunction with the accompanying drawings which illustrate the invention.

BRIEF DESCRIPTION OF TME DRAWINGS

DETAILED DESCRIPTION OF THE INVENTION

Figure 1:
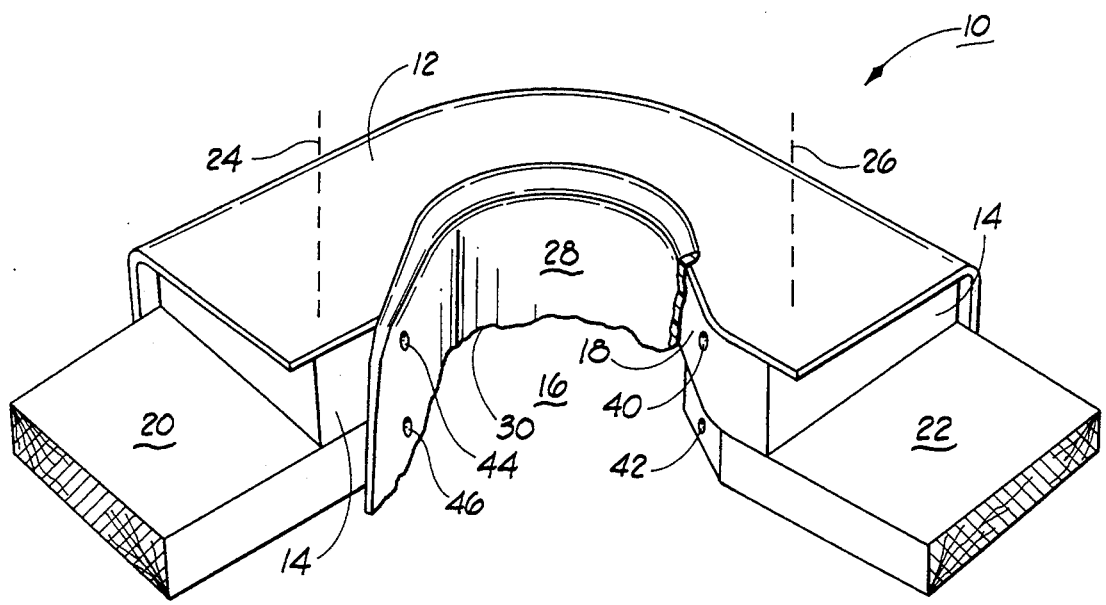
FIG. 1 is a perspective view of a standard type of pool table corner frame with the pocket secured therein that may use the present invention.

Referring to FIG. 1, a corner frame 10 is representative of corner frames utilized by nearly all commercial pool table manufacturers at the present time. Such frame structure has become highly standardized because of the widespread use of pool tables in various commercial establishments such as recreation halls, bars and the like and such tables may be subjected to extremely difficult conditions. In order to maintain pool tables in commercial establishments, it may be necessary to replace pockets and other table fixtures at a much increased rate.

The corner frame 10 includes an outer decorative cover plate 12, polished or engraved chrome or the like, which is secured over a hollow, metal corner mount 14 that defines the pocket or ball drop 16 which is delineated by the rounded inner wall 18 of pocket corner mount 14. The wooden 1×4 boards 20 and 22 constitute the side frames of the table top and are generally secured to the underside of corner mount 14 by means of ⅜ inch bolts (not shown) aligned along axes shown by dash lines 24 and 26. The table slate rests downward upon the wooden side rails 20, 22 and other side rails surrounding the table, and other slate support elements (not shown) support the central portions of the slate to provide requisite strength. Underlying structure including supporting leg (not shown) structure is assembled and secured beneath each of the respective corner frames 10 in well-known manner.

A replaceable pocket 28 is shown in its installed position within inner wall 18 of corner mount 14. The pocket 28 is shown in cutaway form as it normally extends downward into the perforate pocket portion 30 which circles around to a front lip portion (not shown) that fits flush to the pocket drop to complete the forward or near side of the pocket. The pocket 28 also includes an upper collar portion 32 having opposite side panels 34, and a collar flange 36 that fits very closely around the top edge of inner facing 18 and rests on top of cover plate 12.

The pocket 28 is pre-molded to its standard configuration and is usually formed from rubber, neoprene or a suitable plastic that exhibits the required ruggedness and flexibility. The pocket 28 is secured in the inner facing 18 by means of fasteners that are secured through a hole 40 formed in the metal inner facing 18 and a lower hole 42 which may be formed as by drilling in the wooden side rail or portion supporting below the inner facing 18. Each side of the pocket side panels 34 includes the pre-formed securing holes 44 and 46 through which suitable fasteners are placed for securing through inner panel holes 40 and 42 to secure the pre-formed pocket 28 in operative placement.

In present practice, a fastener element known as a swirl nail, a nail formed on the order of a self-tapping screw but having much steeper pitch, is used to secure the pocket 28 within inner facing 18. The actual driving of the securing nail during replacement is not the problem; the time-consuming and often very difficult part of the procedure lies in removal of the old securing nails in order to remove the damaged pocket 28. Quite often the technician will find that the swirl nails cannot be removed by pulling on the exposed head since the head may be broken off or bent into an inaccessible position. In these situations, additional measures are required to remove the swirl nail and especially to remove the nail body from its locked position within side wall 18 and side rail 22, i.e., holes 40 and 42 on each side of inner facing 18. It may then be required to use other removal tools including the drilling out of the broken nail body from the insertion holes, and all such operations take a great amount of time and tend to disrupt scheduling of the route technician or the like.

Figure 2:
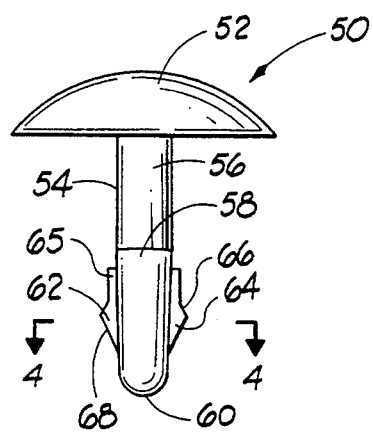
FIG. 2 is a view in side elevation of a fastener constructed in accordance with the present invention.
Figure 3:
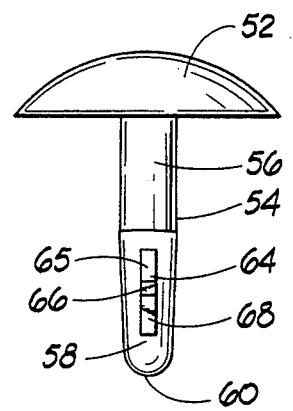
FIG. 3 is a side view in vertical elevation of the fastener of FIG. 2.
Figure 4:
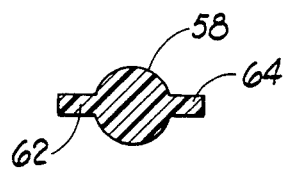
FIG. 4 is a section taken along lines 4—4 of FIG. 2.

The present invention proposes for use in combination with the corner pocket assembly 10 a plurality of molded, plastic fasteners of the pre-fit insertion type, which are readily pulled by means of the outer head or, if broken, pushed on into the interior of corner mount block 14 where they remain without damage or interference with table operation. FIGS. 2, 3 and 4 illustrate a preferred form of fastener 50 which has been designed for the specific purpose. The fastener 50 is molded of a suitable NYLONTEFLON or other selected plastic having sufficiently rugged characteristics. The fastener 50 consists of a flat, rounded head 52 extending an axially aligned shaft 54. The upper portion of shaft 54 is a cylindrical shank 56 that has a length equal to the combined thicknesses of a rubber pocket, a steel insert panel (to be described), and the metal corner mount 14. The second or outer half of shaft 54 is formed as an insert shaft 58 having a slight degree of taper and terminating in a rounded end 60. Along each side of insert shaft 58 in diametrically opposite alignment are first and second interference wedges 62 and 64 which are disposed to function as lock-in elements after the fastener 50 has been press-fit into operational position. As shown in FIG. 3 and 4, the interfering wedges 62 and 64 may be formed with a base 65 and an entry-oriented arrow shape that allows easy entry but difficult extraction. This condition is due to the added resistance offered by barb surface 66 which tends to have greater slope and be much more restrictive than the elongated arrow surface 68 that presents a lesser slope.

Figure 5:
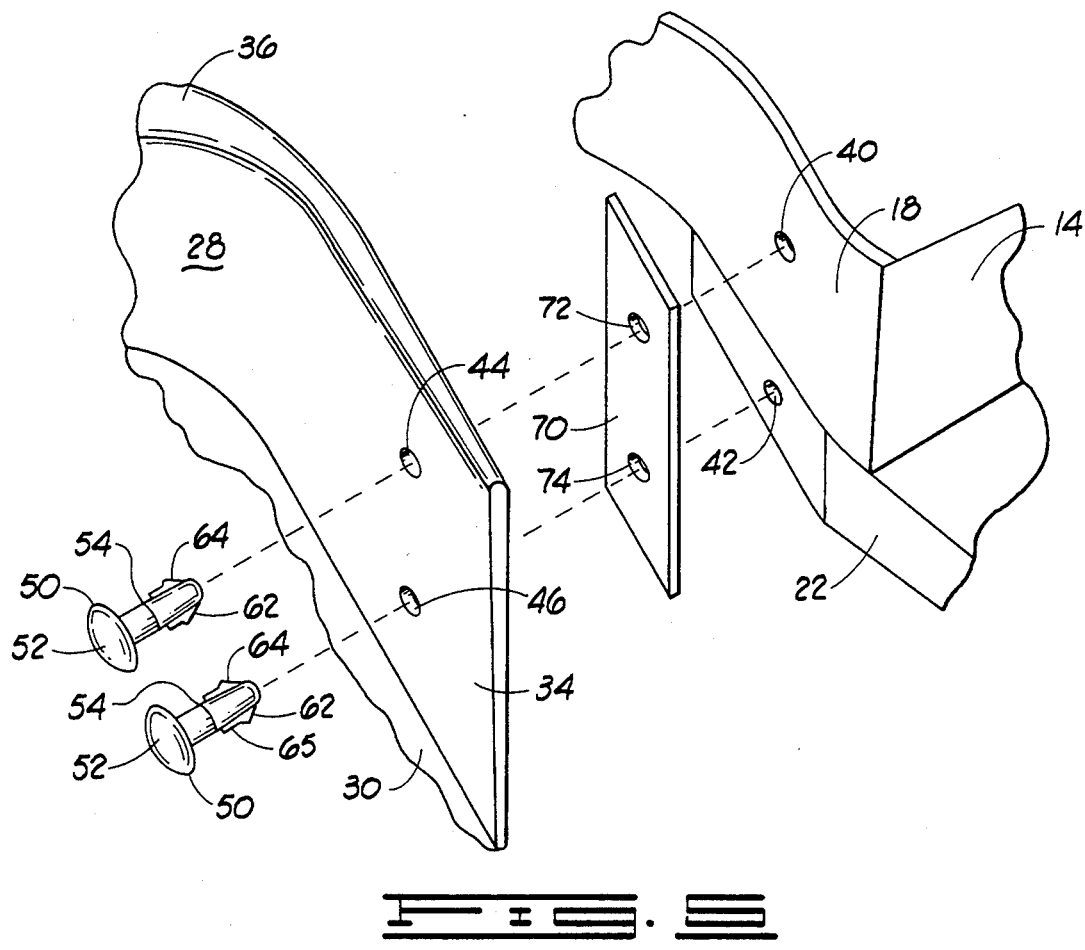
FIG. 5 is a perspective view, in exploded form, showing a portion of the corner frame, an insert panel and a portion of the pool pocket as aligned with locking fasteners.
Figure 6:
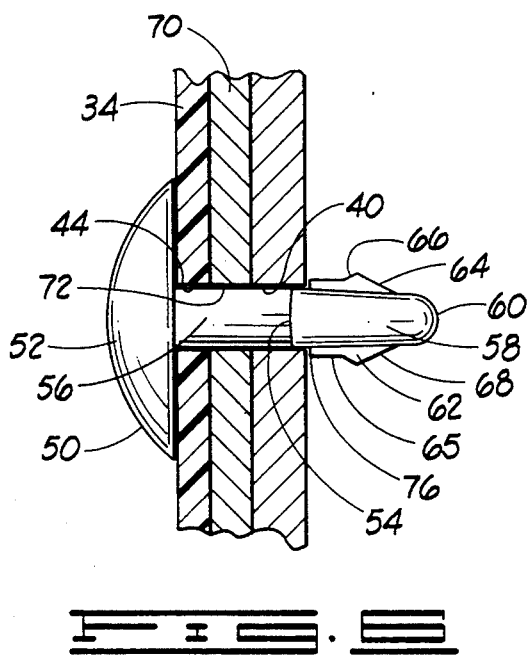
FIG. 6 is a view in section of a completely inserted locking fastener.

FIG. 5 illustrates the manner in which pool table pockets 28 are replaced by use of fasteners 50 and a steel insert panel 70 albeit that only one side panel 34 of a pool pocket 28 is shown. As previously stated, such pool pockets in commercially used equipment receive a great amount of abuse, some of which is extreme and perpetrated intentionally or at least caused under the influence of mean-spirited abuse. Thus, when replacement of pockets is necessitated, the repair technician must proceed to the premises with a supply of new pre-formed pockets 28 and tools necessary to extract damaged pockets and insert substitutes. Using the present invention, the pockets will be secured in the manner illustrated in FIGS. 5 and 6 wherein the fastener 50 with shaft 54 is inserted through the pocket side panel 34, insert panel 70 and inner wall 18 with their respective holes 44, 72 and 40 aligned to receive the shank 56 of fastener 50 therethrough. The fastener shaft 54 is forced through the hole formation by applying external pressure on head 52 such that the wedge formations 62 and 64 spring through the hole to re-expand outward on the inner side of inner wall 18 thereby to provide a tight, very secure locking engagement holding the pocket plies together and in proper placement. Once the fastener 50 is fully inserted into the hole formation through the plies, i.e., consisting of pocket side panel 34, insert 70 and inner wall 18, the arrow formations including bases 65 expand outward to lock tightly behind the hole 40 of inner wall 18. This operation, including the removal of a previously damaged fastener 50, may take only a few minutes as compared with the prior type of operation which sometimes could take more than an hour per fastener.

The same operation follows to insert a fastener 50 through the lower holes (FIG. 5) as the fastener is inserted through respective holes 46, 74 and 42 of respective plies of rubber pocket 34, steel insert 70 and inner wall 18. Fastener 50 functions in the same manner as the interference formations 62 and 64 re-expand outward to lock the inner shaft 58 in a tightly engaged position. In driving the fastener 50 inward, the long sloping portion 68 of arrows 62 and 64 permit easier entry and force-fit through a hole, and a locking effect occurs by virtue of the steeper sloping surfaces 66 of respective arrow formations 62 and 64, as well as the perpendicular surface of top edge 76 of base 65 which functions to lock the fastener into position.

Figure 7:
FIG. 7 is a section through a shank of an alternative form of locking fastener.
Figure 8:
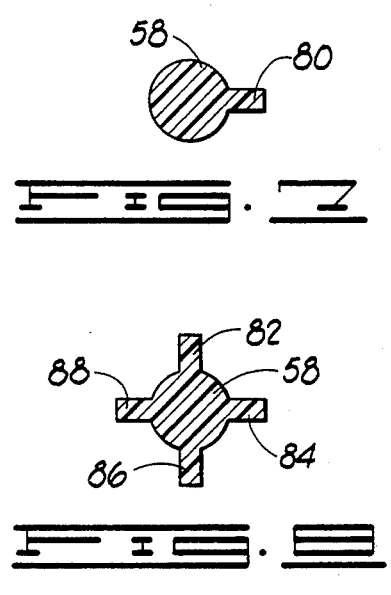
FIG. 8 is a view in section through the shank of yet another alternative form of locking fastener.

FIGS. 7 and 8 illustrate sections similar to the section of FIG. 4 which show some alternative variations of locking structure that might be employed. Thus, the usual type of fastener 50 may include an inner shaft 58 having a single interference formation 80 formed along one side thereof. Since the upper shaft 56 of fastener 50 is received in very tight fit, the presence of a single interfering formation 80 is more than sufficient to maintain the fastener locked in place yet removable with sufficient extraction force. In like manner, FIG. 8 illustrates a lower shaft 58 of an alternative fastener that includes a quadrature array of four such interfering formations 82, 84, 86 and 88 which are integrally molded in combination. This alternative type of fastener would allow proportionately greater adherence to the inserted attitude due to simple multiplication of interfering wedge structures.

The foregoing discloses a novel form of pool pocket quick-insert fastener for use in combination with standard pool table pocket frames to allow quick and reliable repair and pocket replacement. Using fasteners constructed in accordance with the present invention enables much faster and reliable removal of old and/or damaged table pockets. While the replacement of pockets is done rapidly, they are just as securely installed as they were with prior methods and fasteners. Use of the pre-formed fasteners avoids the breaking off of fastener elements in the hole structures, thus avoiding time-consuming drilling and hole clearance measures that can cause significant loss of repair time for the technician.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A combination consisting of a press-fit fastener for securing together an elastomer material pool pocket and a pool table corner mount comprising:
   a pool table corner mount having an arcuate inner wall extending into opposite side inner walls, said corner mount having at least one mount hole disposed through a side inner wall;
   a pool pocket pre-formed to fit into said corner mount inner wall, and having at least one pocket mount hole disposed for alignment with said at least one inner wall mount hole;
   a steel insert plate havinq at least one hole and being inserted between said corner mount and said pool pocket as a spacer element;
   a unitarily formed fastener having a generally flat head and a shaft extending perpendicularly, said shaft consisting of a cylindrical shank extending axially from the flat head with said cylindrical shank diameter being approximately the same as said at least one mount hole and the cylindrical shank length being approximately equal to the combined depths of said at least one corner mount mount hole, said insert plate mount hole and said pocket mount hole, said shaft further extending as an insert shaft having a tapering outer circumference with pliable interference wedges disposed on the outer circumference;
   whereby said fastener is press fit into said pool pocket, insert plate and corner mount at least one mount holes to secure the pocket in place.

2. A combination as set forth in claim 1 wherein: said unitarily formed fastener is molded NYLON.

3. A combination as set forth in claim 1 wherein: said pool pocket is molded from rubber.

4. The combination of a press-fit fastener securing together an elastomer pool pocket and a pool table corner mount comprising:
   a pool table corner mount having a rounded inner wall extending to opposite side inner walls for receiving said pool pocket in juxtaposition, said corner mount and pool pocket each having at least one hole disposed on each of said opposite side inner walls;
   a pair of steel insert plates of pre-set thickness disposed between said corner mount and pool pocket on opposite sides, said insert plates each having a mating mount hole;
   plural molded plastic fasteners press fit into respective holes of said corner mount, insert plate and pool pocket opposite side inner walls, said fasteners having a generally flat head with a cylindrical shank extending axially therefrom with said cylindrical shank diameter being of slightly smaller diameter than said holes, and the cylindrical shank length being approximately equal to the combined depths of the holes through the corner mount, insert plate and pool pocket, said cylindrical shank further extending as a tapered insert shaft with outer circumference having pliable interference formations disposed thereon.

5. The combination as set forth in claim 4 which is further characterized to include:
   two holes on each opposite side of said corner mount and pool pocket to receive respective pairs of fasteners.

6. The combination as set forth in claim 4 wherein: said fasteners are molded from nylon.

7. The combination as set forth in claim 4 wherein: said corner mount is metal; and
said pool pockets are molded rubber.

* * * * *